United States Patent
Banzhof et al.

(10) Patent No.: US 7,278,163 B2
(45) Date of Patent: Oct. 2, 2007

(54) SECURITY RISK ANALYSIS SYSTEM AND METHOD

(75) Inventors: Carl E. Banzhof, Dallas, TX (US); John Davies, Dallas, TX (US)

(73) Assignee: McAfee, Inc., Santa Clara, CA (US)

(*) Notice: Subject to any disclaimer, the term of this patent is extended or adjusted under 35 U.S.C. 154(b) by 131 days.

(21) Appl. No.: 11/062,409

(22) Filed: Feb. 22, 2005

(65) Prior Publication Data

US 2006/0191012 A1   Aug. 24, 2006

(51) Int. Cl.
| | |
|---|---|
| G06F 11/00 | (2006.01) |
| G06F 12/14 | (2006.01) |
| G06F 12/16 | (2006.01) |
| G06F 15/18 | (2006.01) |
| G08B 23/00 | (2006.01) |

(52) U.S. Cl. .................. 726/25; 713/159; 713/185; 705/38; 705/4; 705/7; 717/173

(58) Field of Classification Search .............. 726/5, 726/25
See application file for complete search history.

(56) References Cited

U.S. PATENT DOCUMENTS

| | | | | |
|---|---|---|---|---|
| 5,237,614 A | * | 8/1993 | Weiss ........................ 713/159 |
| 5,931,946 A | | 8/1999 | Terada et al. |
| 5,987,611 A | | 11/1999 | Freund |
| 6,064,972 A | * | 5/2000 | Jankowitz et al. ............. 705/7 |
| 6,298,445 B1 | | 10/2001 | Shostack et al. |
| 6,324,656 B1 | | 11/2001 | Gleichauf et al. |
| 6,334,190 B1 | | 12/2001 | Silverbrook et al. |
| 6,493,871 B1 | * | 12/2002 | McGuire et al. ............ 717/173 |
| 6,766,458 B1 | | 7/2004 | Harris et al. |
| 2002/0026591 A1 | * | 2/2002 | Hartley et al. .............. 713/201 |
| 2002/0087882 A1 | | 7/2002 | Schneier et al. |
| 2002/0138271 A1 | * | 9/2002 | Shaw ........................ 704/270 |
| 2002/0147803 A1 | * | 10/2002 | Dodd et al. .................. 709/223 |
| 2002/0188481 A1 | * | 12/2002 | Berg et al. ...................... 705/4 |
| 2003/0056113 A1 | * | 3/2003 | Korosec ...................... 713/200 |
| 2003/0126472 A1 | | 7/2003 | Banzhof |
| 2003/0135749 A1 | | 7/2003 | Gales et al. |
| 2003/0140250 A1 | * | 7/2003 | Taninaka et al. ............ 713/201 |
| 2003/0196097 A1 | * | 10/2003 | Korosec et al. ............. 713/185 |
| 2003/0233438 A1 | * | 12/2003 | Hutchinson et al. ........ 709/223 |
| 2004/0010709 A1 | * | 1/2004 | Baudoin et al. ............. 713/201 |

(Continued)

OTHER PUBLICATIONS

Carl E. Banzof, et al., Inventory Management-Based Computer Vulnerability Resolution System, Filing Date—Oct. 28, 2004, U.S. Appl. No. 10/975,828, Specification (72 pgs.), Drawings (8 sheets).

(Continued)

*Primary Examiner*—Kambiz Zand
*Assistant Examiner*—Jason Gee
(74) *Attorney, Agent, or Firm*—Conley Rose, P.C.

(57) ABSTRACT

A system and method for assessing risks to computer network is provided. The system includes a first module assesses a human factor related to a risk to the computer network. A second module assesses a remediation to the computer network, and a third module is operable to assess a life cycle of an asset on the computer network. A fourth module assesses a type of the asset used by the computer network.

45 Claims, 3 Drawing Sheets

U.S. PATENT DOCUMENTS

| | | | |
|---|---|---|---|
| 2004/0019803 A1* | 1/2004 | Jahn | 713/201 |
| 2004/0143753 A1 | 7/2004 | Hernacki et al. | |
| 2004/0170153 A1* | 9/2004 | Stewart et al. | 370/338 |
| 2005/0010821 A1* | 1/2005 | Cooper et al. | 713/201 |
| 2005/0044037 A1* | 2/2005 | Lawrence et al. | 705/38 |

OTHER PUBLICATIONS

Carl E. Banzhof, et al., Method and Apparatus for Protecting a Remediated Computer Network From Entry of a Vulnerable Computer System Thereinto, Filing Date—Mar. 25, 2004, U.S. Appl. No. 10/810,927, Specification (51 pgs.), Drawings (6 sheets).

CERT® Advisories, "CERT/CC Adivisories 1988-2000," http://web.archive.org/web/20000815055129/http://www.cert.org/advisories/, 2000, 34 pgs.

Products Overview, Network Security Solutions—Improve the Security of Your Network with Foundstone, Inc., http://www.foundstone.com/products/overview.htm, 2 pgs.

International Search Report and Written Opinion of the International Search Authority, International Appl. No. PCT/US2006/055110, Jan. 26, 2007.

* cited by examiner

SECURITY RISK ANALYSIS SYSTEM AND METHOD

CROSS-REFERENCE TO RELATED APPLICATIONS

This application includes subject matter similar to U.S. Patent Publication 2003/0126472; U.S. patent application Ser. No. 10/810,927 to Banzhof et al. filed Mar. 25, 2004 and entitled "Method And Apparatus For Protecting A Remediated Computer Network From Entry Of A Vulnerable Computer System Thereinto"; and U.S. patent application Ser. No. 10/975,828, to Banzhof et al. filed Oct. 28, 2004 and entitled "Inventory Management-Based Computer Vulnerability Resolution System", all of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention relates generally to the remediation of computer networks and, more particularly, to a computer vulnerability resolution system that utilizes enhanced risk assessment and enhanced remediation assessment processes in the remediation of vulnerabilities in computer networks.

BACKGROUND OF THE INVENTION

Each year, computer systems face increasing numbers of vulnerabilities. For example, the Computer Security Institute reported 417 vulnerabilities for the year 1999, 1,090 vulnerabilities for the year 2000, 2,437 for the year 2001, 4,129 for the year 2002 and 3,784 for the year 2003. Not only has the reported number of vulnerabilities increased dramatically since 1999, the increasing number of computer systems which are interconnected with other computer systems in a computer network and the increasing complexity of such networks have made the task of protecting computer systems from such vulnerabilities increasingly difficult and costly.

For example, it has become quite difficult for a network security administrator to maintain an accurate inventory of hardware and, in particular, software programs residing on each computer system that form part of a computer network. Indeed, only minutes are needed for a user to download new software programs onto a computer system from the Internet. With each new piece of hardware or software added to a computer system, another potential vulnerability from which the computer network must be protected is created. However, the network security administrator may not even be aware of the need to remediate the computer network to address a newly discovered vulnerability in a particular piece of computer hardware or software if the network security administrator erroneously believes that the hardware or software is not installed within any of the computer systems forming the computer network.

Currently, many network security administrators use vulnerability scanning software or managed security providers to test individual computer systems of a computer network for security weaknesses. Scanning software can automatically examine the components in a computer system and determine whether any vulnerabilities exist in the components. Typically, such tools generally provide detailed information on the vulnerabilities found in the computing environment of the tested computer systems, but provide limited means for correcting or resolving the detected vulnerabilities. In order for the network security administrator to remove the vulnerabilities, the network security administrator must typically expend a large amount of labor and resources to identify vulnerabilities. Additional labor is then required to install the vulnerability remediation or otherwise resolve the identified vulnerabilities. Oftentimes, this involves the network security administrator visiting each affected computer system and manually applying the necessary remediation. In addition, once a remediation is applied to a computer system, a user can easily remove it or install additional software that invalidates the remediation, thereby wasting all of the effort expended during the initial installation of the vulnerability resolution and meanwhile leaving the network administrator to believe the network is safe.

U.S. Patent Publication No. 2003/0126472 to Banzhof, published Jul. 3, 2003, discloses an automated vulnerability resolution system in which a remediation database is constructed from an aggregation of vulnerability information for plural computer vulnerabilities. Remediation signatures to address these vulnerabilities are constructed for subsequent deployment to a client remediation server. Banzhof further discloses managed remediation techniques that include the selective deployment, by the client remediation server, of the remediation signatures to resolve vulnerabilities of computers coupled to the client remediation server.

While Banzhof represents a significant improvement over prior techniques that required the manual remediation of vulnerable computer systems, the automated vulnerability resolution system disclosed in Banzhof requires significant control of the remediation process by the network security administrator operating the client remediation server. More specifically, while the network security administrator has been provided with a series of remediation signatures capable of resolving vulnerabilities within the network, the network security administrator was still responsible for vulnerability identification and remediation tasks.

SUMMARY

In one embodiment, the present disclosure is directed to software for assessing risks to computer network. The system includes a first module which is operable to assess a human factor related to a risk to the computer network. A second module assesses a remediation to the computer network, and a third module is operable to assess a life cycle of an asset on the computer network. A fourth module assesses a type of the asset used by the computer network.

In another embodiment, the present disclosure provides a method for assessing a risk to a computer network. The method includes identifying a human factor related to a risk to the computer network, and determining a risk level using the human factor. The method also includes remediating at least a portion of the computer network based on the risk level.

In one embodiment, a method for assessing a risk to a computer network is provided. The method includes identifying a signature to remediate vulnerabilities on at least a portion of the computer network. The method includes determining a "signature risk" related to the signature to remediate at least a portion of the computer network, and deciding whether to remediate the portion of the computer network using the signature based on the signature risk.

In another embodiment, the present disclosure is directed to a system for protecting a computer network from vulnerabilities. The system includes an analysis module, a risk assessment module, and a remediation module. The analysis module determines whether a specified device resides on the computer network. The risk assessment module evaluates at least one risk factor used to assess risk to the computer network. The remediation module remediates the specified device on the computer network.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Figure 1:
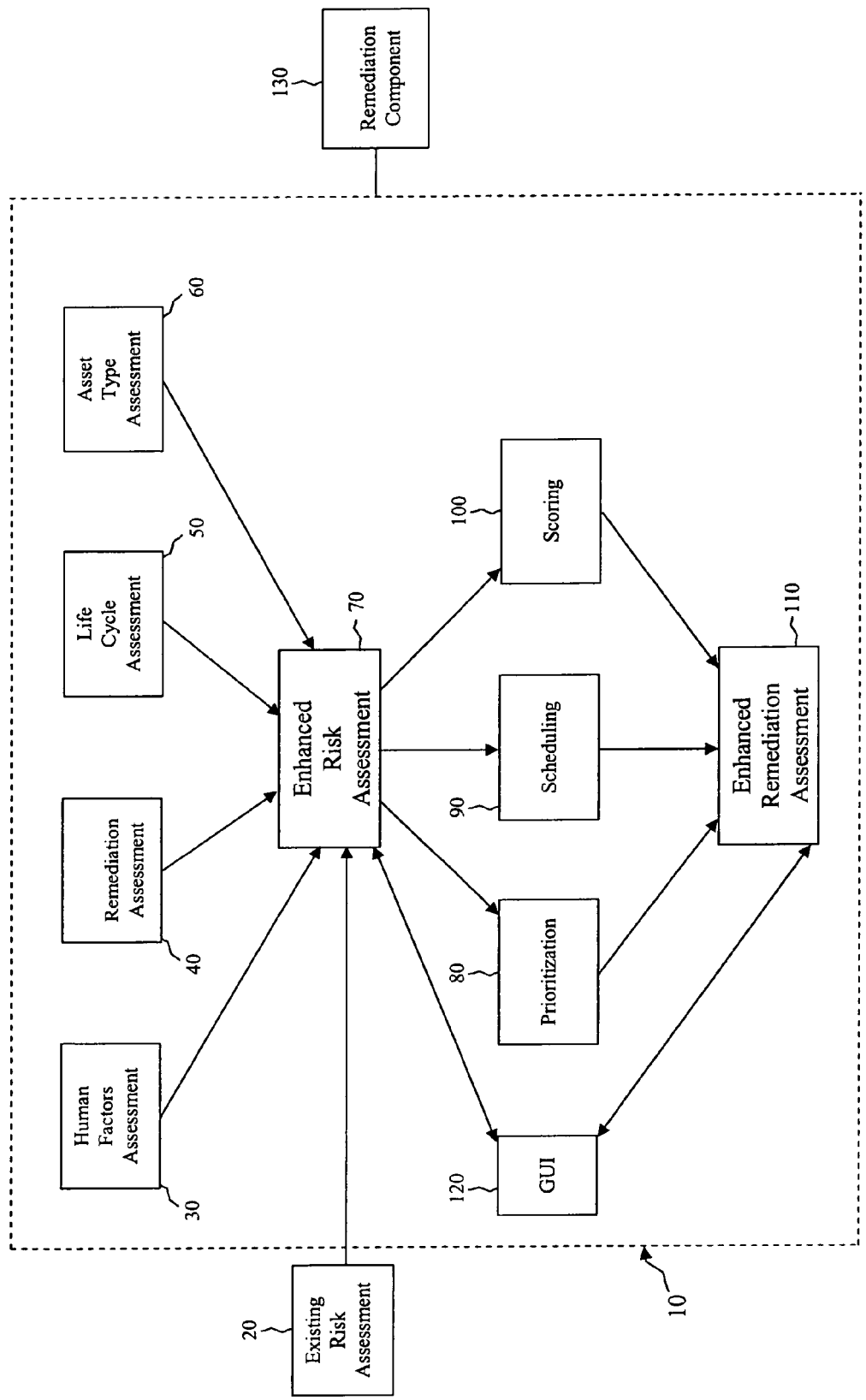
FIG. 1 is a block diagram illustrating an enhanced automated vulnerability resolution system for remediating one or more computer systems and/or computer networks.

In the detailed description and claims which follow, certain terms are used to refer to particular system components. As one skilled in the art will appreciate, components may be referred to by different names. Accordingly, this document does not intend to distinguish between components that differ in name, but not function.

Also in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, wireline communicative, or wireless communicative connection. Thus, if a first device couples to a second device, that connection may be through a direct connection, or through an indirect connection via other devices and connections. Items shown or discussed as directly coupled or communicating with each other may be coupled through some interface or device, such that the items may no longer be considered directly coupled to each but may still be indirectly coupled and in communication, whether electrically, mechanically, or otherwise, with one another.

The term "vulnerability" generally refers to any hardware, software or firmware weakness or design deficiency that leaves a computer system open to assault, harm, or unauthorized exploitation, either externally or internally, thereby resulting in a risk of information compromise, information alteration, service denial, or other unauthorized alteration of the computer system.

The terms "remediate" and "remediation" generally refer to addressing or resolving vulnerabilities by taking a series of steps or actions to reduce, eliminate, limit, or otherwise alleviate the security risk presented by the subject vulnerabilities.

Definitions for certain other words and phrases may be provided throughout this document. Those of ordinary skill in the art should understand that in many, if not most instances, such definitions apply to prior, as well as future uses of such defined words and phrases.

DETAILED DESCRIPTION

The detailed description which follows contains specific details intended to provide the reader with an understanding of how to practice the present invention. However, those skilled in the art will readily appreciate that the present invention may be practiced without such specific details. In other instances, well-known elements have been illustrated in schematic or block diagram form in order not to obscure the present invention through unnecessary detail. Additionally, some details have been omitted inasmuch as such details are not considered necessary to obtain a complete understanding of the present invention, and are considered to be within the understanding of persons of ordinary skill in the relevant art. It is further noted that, unless indicated otherwise, all functions described herein may be performed in either hardware, software, firmware, or a combination thereof.

Automated vulnerability resolution systems such as the enhanced automated vulnerability resolution system to be more fully described below, have provided numerous benefits to network security administrators. More specifically, systems such as these have been able to enhance the protection of computer systems and networks by resolving vulnerabilities within the computer networks before the vulnerabilities provide a threat with an opportunity to wreak havoc within the computer network, for example, when a fast-spreading computer virus causes any number of computer systems to crash. Examples of such automated vulnerability systems are disclosed in U.S. Patent Publication 2003/0126472 to Banzhof; U.S. patent application Ser. No. 10/810,927 to Banzhof et al. filed Mar. 25, 2004 entitled "Method And Apparatus For Protecting A Remediated Computer Network From Entry Of A Vulnerable Computer System Thereinto"; and U.S. patent application Ser. No. 10/975,828 to Banzhof et al. filed Oct. 28, 2004 and entitled "Inventory Management-Based Computer Vulnerability Resolution System", all of which are hereby incorporated by reference for all purposes as if reproduced in their entirety.

The above-referenced patent publication and patent applications describe an automated vulnerability resolution system wherein inventories of computer assets and vulnerabilities allowing unauthorized access to those assets are automatically generated. Resolution signatures and/or action packs that address the vulnerabilities are also created and mapped to the appropriate vulnerabilities. Typically, a remediation signature is a list of actions taken to address or resolve a vulnerability. In this embodiment, the remediation signatures include the following types of remediation actions: service pack, hot fix and patch installation, service management, registry management, security permissions management, account management, policy management, audit management, file management, and process management. These types of remediation actions are generally known in the computer security industry.

The enhanced automated vulnerability resolution system hereinbelow described includes all of the features of the vulnerability resolution systems set forth in the above-referenced patent publication and patent applications and encompasses a number of enhancements over prior systems. More specifically, additional risk assessment and remediation assessment capabilities are provided wherein human factors are taken into account in the assessment of risks, enhanced selectivity in the installation of patches is provided, and greater control in evaluating, prioritizing, and scheduling remediation activities is provided. To facilitate a description of these enhancements and to avoid unnecessary description of features common to both the current and prior automated vulnerability resolution systems, certain portions of the description of the common features have been omitted from the description which follows.

FIG. 1 illustrates components in an embodiment of an enhanced automated vulnerability resolution system 10. An enhanced risk assessment 70 is created based on input from previously existing risk assessment procedures 20 as well as a human factors assessment 30, a remediation assessment 40, a life cycle assessment 50, and an asset type assessment 60 (where asset type might include databases, files containing source code, or software that provides critical functionality to organization operation).

The enhanced risk assessment 70 may be used as input into a prioritization component 80 for remediation activities, a scheduling component 90 for remediation activities, and a scoring component 100 for remediation options. The prioritization component 80, scheduling component 90, and scoring component 100 are then used to create an enhanced assessment 110 of the remediation options.

The enhanced automated vulnerability resolution system 10 can perform a human factors assessment 30 to take various human factors into account in its assessment of the risks to a computing system. Several examples are presented here to illustrate the types of human factors that might be considered. The human factors may include a variety of sub-factors such as, but not limited to, an emotional factor, a geopolitical factor, a demographic factor, a job positions factor, and a behavior factor. One of skill in the art will recognize that these examples are not exhaustive and that other human factors can be taken into account.

The emotional disposition factor might consider the emotional disposition of individuals who might wish to harm a computing system protected by the enhanced automated vulnerability resolution system 10. For instance, a disgruntled employee might wish to take advantage of a privileged access status to sabotage the computing systems of his employer. Furthermore, insight may be gained by a greater understanding of the employees that pose a threat. History has shown that the likelihood of an individual attacking their company may be related to the position that the person holds within the company. For example according to the U.S. Secret Service and CERT Coordination Center, 19% of attacks are committed by company employees in professional positions, 23% of attacks are committed by company employees in technical positions, 23% of attacks are committed by company employees in administrative/clerical positions, 31% of attacks are committed by company employees in service positions. As with positions held by these individuals, their reasons for committing the attack may also lend insight useful in safeguarding the company. The reasons include (by percentage of attacks): company dissatisfaction 15%, desire for respect 15%, theft of proprietary information 19%, revenge 23%, multiple motives 27%, deliberate sabotage 27%, financial gain 81%. Also, an outsourced former employee might wish to avenge perceived grievances against a former employer by damaging the employer's computing systems. Alternatively, external consumers may hold a grudge against a company for various reasons and may wish to harm the company through denial of service attacks, web page defacement, viruses, worms, and other well-known forms of attack. By taking into account the attitudes and intentions of potential attackers, an enterprise might be able to perform an improved assessment of the risks to its computing systems.

The geopolitical factor may consider the geopolitical status of individuals who may wish to harm a computing system protected by the enhanced automated vulnerability resolution system 10. An enterprise might determine that individuals of certain nationalities, ethnicities, or other cultural, sociological, or ideological categories present an elevated risk and the enterprise might include information about such individuals in an evaluation of the threats to its computing systems. For example, certain countries might be less politically or economically stable than others. If an enterprise outsourced some of its information technology-related work to individuals or businesses in countries with a history or a potential for volatility, the enterprise might consider that the data manipulated within such a country is at an elevated risk and might adjust the level of protection on that data accordingly.

The demographic factor may consider information about potential attackers, such as age, gender, or marital status. For instance, the enterprise might assume that a young single male is more likely to launch an external attack on its computing systems than is an older, married female. When internal threats are considered, an enterprise might consider young employees to be more likely to download harmful software or to intentionally perform other actions with the potential for causing damage. An older, less technically adept employee might be more likely to unintentionally make mistakes that lead to damage. The enterprise might adjust its risk assessments accordingly to take such demographic factors into account.

A job positions factor may take into account the job position or role held by an employee or contractor. When internal threats to a company are considered, an employee or contractor with access to critical systems might be considered a greater threat than an employee or contractor without such access. Also, an employee or contractor working in a technically challenging position, even if the employee or contractor is not allowed access to critical systems, might be considered more likely to attempt an attack on a computer network than an employee or contractor in a less technically demanding job, such as an administrative position. In addition, a contract worker for a company might be deemed a greater security threat than a worker employed directly by the company since the contractor may not feel the same level of loyalty to the company or may not have the same financial incentives to promote the company's best interests.

Similarly, the level of technical expertise of potential attackers, both internal and external, might be another human factor to be considered. Individuals with extensive knowledge of computer hardware or software, such as computer science students or graduates, might pose a greater threat than individuals who are not technically sophisticated. On the other hand, when internal threats are considered, an employee who is a technical novice might be more likely to cause unintentional damage than a technical expert. An enterprise might consider technical expertise from both perspectives when assessing the risks posed by various individuals.

The behavior factor considers the history of an individual's patterns of behavior, particularly regarding computer-related activities. For instance, a pattern of using certain computing applications, a pattern of visiting certain web sites, a pattern of subscribing to certain newsgroups, downloading computer security or attack tools, attempting to access unauthorized network resources, or other suspicious tendencies could be an indication that an individual is contemplating an attack on a computing system. Behavior patterns might also suggest that an individual is targeting certain components of a computing system such as a database of customer information or a company's web site. A risk assessment could take such behavior patterns into account.

Data related to human factors could be collected in various ways. For example, employees within a company could directly observe other employees to gather demographic information, behavior information, and information that might suggest the state of mind of other employees. Also, when an employee logs in to a computing system, information about the employee could be retrieved from a human resources database and could be correlated with information on the employee's activities while logged in. Alternatively, the information may be obtained at a risk assessment stage and may not be coupled to a login. An employee or an external user could be presented with a questionnaire and be asked to provide information when logging in to a computing system. Also, patterns of behavior while logged in could be recorded for employees or external users. System usage outside of scheduled or normal times may get heightened scrutiny and/or raise risk levels. In addition, IP addresses, email addresses, and other identifying information can be correlated with demographic, geo-political, and other human factor-related information to generate data to assess risk. Other manners of gathering human factors information will be apparent to one of skill in the art.

After human factors information has been collected, it can be evaluated to create a quantifiable assessment of the risk to a computing or other system. The evaluation might be an automated process that follows a set of rules for converting human factors into risk levels. Alternatively, a security administrator or other individual might examine the human factors and make a subjective judgment regarding the level of risk they pose. A combination of automated and subjective assessments might also be used.

When the assessments are complete, scores might be assigned to the risk levels and the scores might be used in guiding remediation efforts. The scores might be assigned automatically by the enhanced automated vulnerability resolution system 10, manually by an administrator, or through a combination of both. For example, after the enhanced automated vulnerability resolution system 10 automatically assigns a score, an administrator might make subjectively based adjustments to the score. The administrator might also make adjustments to the rules on which the automatically derived score was based so that future automatically derived scores more closely match the subjective judgments or observed or known risk levels.

The above examples illustrate a few of the human factors that might be considered in the assessment of risks to a computing system. One of skill in the art will recognize that these factors, other human factors, and various combinations of these and other human factors might be relevant to a risk assessment.

In addition to considering human factors, the enhanced automated vulnerability resolution system 10 can perform the remediation assessment 40 that provides enhanced control over the installation of remediations, which may include, but are not limited to, patches and other upgrades or modifications to software. From one view, a remediation is the repair of the vulnerability and a remediation signature is the recipe used to make the repair. The signature risk or remediation risk would include both the risk of the actions directly in the signature and those incorporated within it. For example a signature may work to download and install a patch or upgrade. The signature actions may be evaluated for risk the patch being installed may also be evaluated for risk (i.e. patch risk), both of which could be used to assess the remediation or signature risk.

Remediations, such as patches can be particularly problematic since most fixes for software deficiencies take the form of patches. Prior automated vulnerability resolution systems might have offered the choice of whether or not to install a patch, but did not consider problems associated with patches. These prior systems might automatically install every remediation that becomes available, but this is not always advisable since some remediations might actually create problems or vulnerabilities or cause harm to a computing system by creating incompatibilities with critical applications running on the system. Some remediations have been known to fail to resolve the problems they are intended to fix or to solve one problem but create another.

For example, a patch may close one communication path that provides an avenue of attack on a network, but may open others. Also, some types of equipment might not operate properly if a remediation is applied. For instance, hospital or other business using specialized equipment might use specialized operating systems or software routines that may not be compatible with an upgrade or patch and could fail if a patch is applied. Automatic installation of patches on such devices could endanger not only the machines, but also the patients on whom the machines are used. In addition, some vendors might provide support for their products only when the products use a particular version of software. Adding a remediation to such software might mitigate a vulnerability, but void the warranty of the system or the software. Also, some remediations may cause failure of a system because the system will not operate on a newer version of software, for example. Another analysis of a remediation may include that remediation has a low incidence of problems on one platform, such as a particular operating system or version, but has a higher incidence, or perhaps less know, of risks on another operating system or version.

The enhanced automated vulnerability resolution system 10 allows an evaluation of remediations to be included in the overall assessment of the risks to and remediation for an enterprise's computing systems. In addition to evaluating the effectiveness of remediations and impact on warranties and operations of various systems, the enhanced automated vulnerability resolution system 10 might consider other factors in determining the threat a remediation might pose. For example, since remediations could contain viruses, remediations can be monitored before they are installed to verify that they do not contain viruses. Information on remediation-related problems or issues with installations of remediations may be provided by systems administrators, found at a web site operated by a vendor of the software being remediate, the remediation vendor's web site, or otherwise obtained.

A remediation may be assessed for the risk it might pose if it is installed and this risk might be compared to the risks to an enterprise's computing systems if the remediation is not installed. Factors that might be considered in balancing the risks of installing versus the risks of not installing a remediation might include the threats to and vulnerabilities of a computing system, the problems and risks related to the remediation, and other problems, such as voided warranties, that might be caused by the remediation. The various factors can be given relative weights by a human administrator or by an automatic system that follows a set of rules in a weighting algorithm. A recommendation on whether or not to implement a remediation can be based on these weights. An administrator may simply accept the automatically derived recommendation or may use the weights as a basis for a subjective judgment. The administrator might also modify the weights or the rules if such a modification is deemed necessary.

In one embodiment, the system may maintain or store information related to threats that have been identified in the wild, such as active exploit code contained, for example, in worms or viruses. In analyzing such a risk, consideration may be given to specific vulnerabilities where viruses or other active exploit code have actually been identified that exploit those specific vulnerabilities. On a scale the risk would vary from theoretical vulnerabilities with no known active exploit code on one end of the scale to vulnerabilities with a few, relatively ineffective, efforts to exploit in circulation to actual vulnerabilities with highly effective widely available active exploit codes on the other end of the scale. As a specific example, the risk may be considered higher for a vulnerability to a system when a virus that exploits that vulnerability has been identified, versus another vulnerability to the same system where no active exploit code or viruses have been identified.

The number of systems that could be affected by a remediation might also be considered. The greater the number of affected systems, the greater might be the assumed risk of the remediation. The enhanced automated vulnerability resolution system 10 might also determine that certain portions of an enterprise's computing systems already have adequate security measures in place and that a security upgrade remediation is not necessary for those portions. In addition, a remediation might be installed on a portion of a system where little damage is likely to occur should the remediation be defective. The effects of the remediation could be observed for a period of time and, if no harm has been found to occur, the remediation could then be installed on more sensitive portions. Other factors for analyzing the remediation risk levels may include the length of time the remediation has been in distribution inside or outside the enterprise.

The life cycle assessment 50 considers the life-value cycle of software or of portions of a computing system in the assessment of risks to the system. For example, the value of a particular piece of software typically varies over its lifetime based on numerous factors. A software development project in the prototype stage is typically not of as much value as one in the development stage or one close to completion. Thus, the risk levels may be dynamic since the risks may change or cycle over time based on these factors. For example, the risk of attack or attempt to obtain source code is greater, for example, on the eve of release of a highly publicized or highly desirous new computer application or game, as compared with the lowering risks over the following months or years. Once the software is released, however, its value may begin to decline since it may slowly become obsolete. Also, certain portions of a computing system might have more value at some times than at others. For instance, the greatest amount of information is likely to be contained in a billing system at the point in a billing cycle when bills are just about to be released. Also, the billing system might be considered to have its greatest value and/or have a higher likelihood of being attacked at that point since the greatest disruption could occur if the system were attacked at that time. The value of software or of portions of the computing system could be taken into account in an assessment of the risks to a computing system, with the risks being deemed greatest when the values are the greatest.

In the assessment of the risks to a computing system, the asset type assessment 60 considers the characteristics of the inventory components, including the software or source code or the portions of the computing system to be protected. For example, an automated inventory survey might determine that there is a database on a particular piece of hardware. Since data intrinsically has value, the enhanced automated vulnerability resolution system 10 might contain a rule stating that a machine containing a database is automatically given an elevated level of protection or scored differently relative to the risks and vulnerabilities of the database. Similarly, source code typically has a high value, so any systems with files that contain source code can automatically be rated with a high value. Due to the life-value cycle considerations mentioned above, the creation date of the source code can also be considered in assigning a value to a system with a file that contains source code. Asset type assessment 60 may refer to risk consideration based on the type of inventory component.

Other factors may be considered when assessing risks to the enterprise computing and other systems including an events factor and a type of access factor. An enterprise might determine that certain portions of its computing systems might be at greater risk due to threats from known or unknown individuals, or groups based on, for example, world events, inside or outside influences or events which may have an impact, collectively or otherwise, on such individuals or groups. For example, the portions of the computing system with greater public visibility might be more likely to be attacked than less visible portions. That is, a potential attacker might be more likely to attack a high-profile company's home web page than the web site of the company's less well known subsidiary. Also, the more valuable components of a computing system, such as customer data, might be considered more likely to be attacked by such individuals. The company may adjust the level of protection for its web sites and other components of its computing systems accordingly.

The most likely timing of attacks by such individuals might also be considered. That is, attacks by such individuals might be more likely to occur after a company is involved in an activity that is made well known to the public. For example, activities that may be perceived negatively or that have a negative impact on individual(s), business(s), a group(s), or the environment. For example, an announcement of poor financial performance, a release of software that has bugs, or other undesirable events could induce certain individuals to attempt acts of, for example, retribution against a company. The company might adjust the level of protection on its computing systems when such events occur or, when possible, in advance of such events.

The types of access factor may consider an individual's method or type of access to an enterprise's computing systems remotely. An employee might be given the ability to gain remote access to his employer's network from home, or in a mobile or wireless manner by means of a secure login procedure on a laptop computer, for example. If the employee fails to keep the laptop computer and remote access password secure, an attacker could use the laptop to access and harm the network. For example, an attacker might steal the laptop and use it to gain access to secure data or software. Alternatively, if the employee uses the laptop in a public place, an attacker might observe the display monitor to gather information that could be useful in attacking the enterprise. For instance, an attacker might be able to observe a login ID and/or a password or might simply observe data that could be damaging to the enterprise if it were made public. The encryption of data and the security of communication channels for the data are also factors that might be considered in such situations. The security of the communication channel, such as via SSL (Secure Socket Layer) or VPN (Virtual Private Network), over which remote or other access is provided may also be considered as a factor. When an enterprise assesses the risks of such remote access users and activities, the enterprise might consider the habits or traits of remote users and take such factors into consideration when determining the risk to and vulnerabilities of associated systems.

The conditions under which remote access computers will be used might also be considered. For example, an employee who uses a wireless internet connection in a public area to connect to an enterprise's secure internal network might present an elevated security risk. Connection to the secure internal network through a residential dial-up connection or through a wired connection in a public place might also pose a risk. Other remote access factors which may be considered may include access to the company's systems by employees or others through a third-party network, such a from the computer network of a vendor or customer.

The enhanced automated vulnerability resolution system 10 can combine the assessments of software characteristics, software life cycles, patches, and human factors with existing risk assessment procedures to create an enhanced assessment 70 of the risks to a computing system. The enhanced risk assessment 70 can include a risk factor that is assigned to the risks to quantify the exposure to adverse effects on computing systems. Each of the types of assessments can be assigned its own risk factor or various combinations of the types can be given a single risk factor. The enhanced risk assessment 70, in turn, can be combined with enhanced remediation assessment procedures described below to generate an enhanced assessment 110 of the options available for resolving vulnerabilities in and threats to a computing system.

One of the enhanced remediation assessment procedures involves the prioritization 80 of remediation activities. The risk factors assigned in the risk assessment 70 can be used to identify the computing systems or portions of computing systems within an enterprise that have the highest value, that are at the highest risk, or that would cause the greatest disruption or greatest loss of revenue if they were successfully attacked. The urgency of remediation activities and/or the order in which remediation activities occur can then be ranked based on the enterprise's priorities for protecting its assets. For example, remediation activities might be prioritized so that the highest valued systems are remediated first or so that systems that would cause the greatest potential disruption if successfully attacked are addressed first.

Another enhanced remediation assessment procedure involves the scheduling 90 of the installation of remediations, such as patches and other software modifications. For example, the enhanced automated vulnerability resolution system 10 might specify that installation of remediations should be delayed until known problems with the remediations are resolved or are expected to be resolved. Installation of remediations on new software might be deferred until the software is determined to be operating correctly. The life cycle of software or systems might also be considered in the scheduling 90 of remediation installations. That is, remediation installation might be done at a time when the reliance on or the value of software or systems is low so that the expense of any adverse effects caused by a remediation is minimized.

Some remediation installations or other remediation activities may be automatically scheduled to occur at regular intervals or as they become available. The enhanced automated vulnerability resolution system 10 might adjust the schedule by taking the enhanced risk assessment into account. For example, a billing system might operate only at the end of a month or a batch process might occur only on weekends. It would typically be undesirable for remediation activities to take place on such systems during or near their periods of peak operation. A computer administrator might enter into the enhanced automated vulnerability resolution system 10 the times when such systems are available or when critical operations are or are not occurring. The enhanced automated vulnerability resolution system 10 might automatically take those times into account in the scheduling 90 of remediation activities. The schedules of all systems may be considered and remediation activities could take place when the least disruption to the fewest systems would occur. If a critical update needed to be made at a time when a system was unavailable, the enhanced automated vulnerability resolution system 10 could alert an administrator to decide whether to make the system available for the remediation or whether to delay the remediation.

The enhanced automated vulnerability resolution system 10 might also consider budget and/or man-hour constraints on the scheduling 90 of remediation activities. The scheduling 90 may maintain or interface with systems maintaining the technical capabilities and availability of the enterprise's human resources to schedule remediation activities accordingly. For example, each remediation activity could be assigned a cost that accounts for both the monetary and the labor expenditures likely to be needed to implement the remediation. A budget could be created that specifies the total expenditure that will be directed toward all remediation activities. Based on the budget and the remediation costs, a remediation schedule could then be created that might specify that a small number of expensive remediation options will be implemented, a large number of inexpensive remediation options will be implemented, or some other combination of remediation options that fit within the budget constraints will be implemented or prioritized to reduce the risks as much as possible given the budget constraints, for example.

Scoring 100 can be provided for the remediation options. When multiple remedies are available for a particular threat or vulnerability, the enhanced automated vulnerability resolution system 10 can aid in the determination of which remedy will be implemented. For example, the enhanced automated vulnerability resolution system 10 might automatically review the enhanced risk assessment and the potential remedies. A remedy evaluation algorithm could then be followed to automatically assign a score to each of the remediation options and the most appropriate option could automatically be selected based on the scores. Alternatively, a human administrator might review the remediation options, manually assign scores to the options, and choose an appropriate remedy. Various combinations of automatic and manual scoring and selection could also be used.

The prioritization 80 of patches and other remediation activities, the scheduling 90 of patches and other remediation activities, and the scoring 100 of remediation options can be combined to create an enhanced assessment 110 of the remediation activities an enterprise might undertake. In a fully automated (enhanced) vulnerability resolution system 10, the enhanced remediation assessment 110 might cause an appropriate remediation option to be automatically implemented without human intervention. Alternatively, a graphical user interface 120 might allow an administrator to view the assets, threats, vulnerabilities, and remediation options identified by the enhanced automated vulnerability resolution system 10, including the enhanced risk assessment information 70 and the enhanced remediation assessment information 110. The administrator might then select a remediation option and implement the selection through an entry into the graphical user interface 120. A combination of automatic choices and graphical user interface-based selections could also be used. The administrator might also use the graphical user interface 120 to modify the enhanced risk assessment information 70 or the enhanced remediation assessment information 110.

FIG. 1 also illustrates an automated remediation component 130 which is operable to automatically or manually remediate the vulnerabilities identified by the enhanced remediation assessment information 110 based on all, some, or various combinations of the factors identified above, the prioritization 80, scheduling 90, and scoring 100 components.

Figure 2:
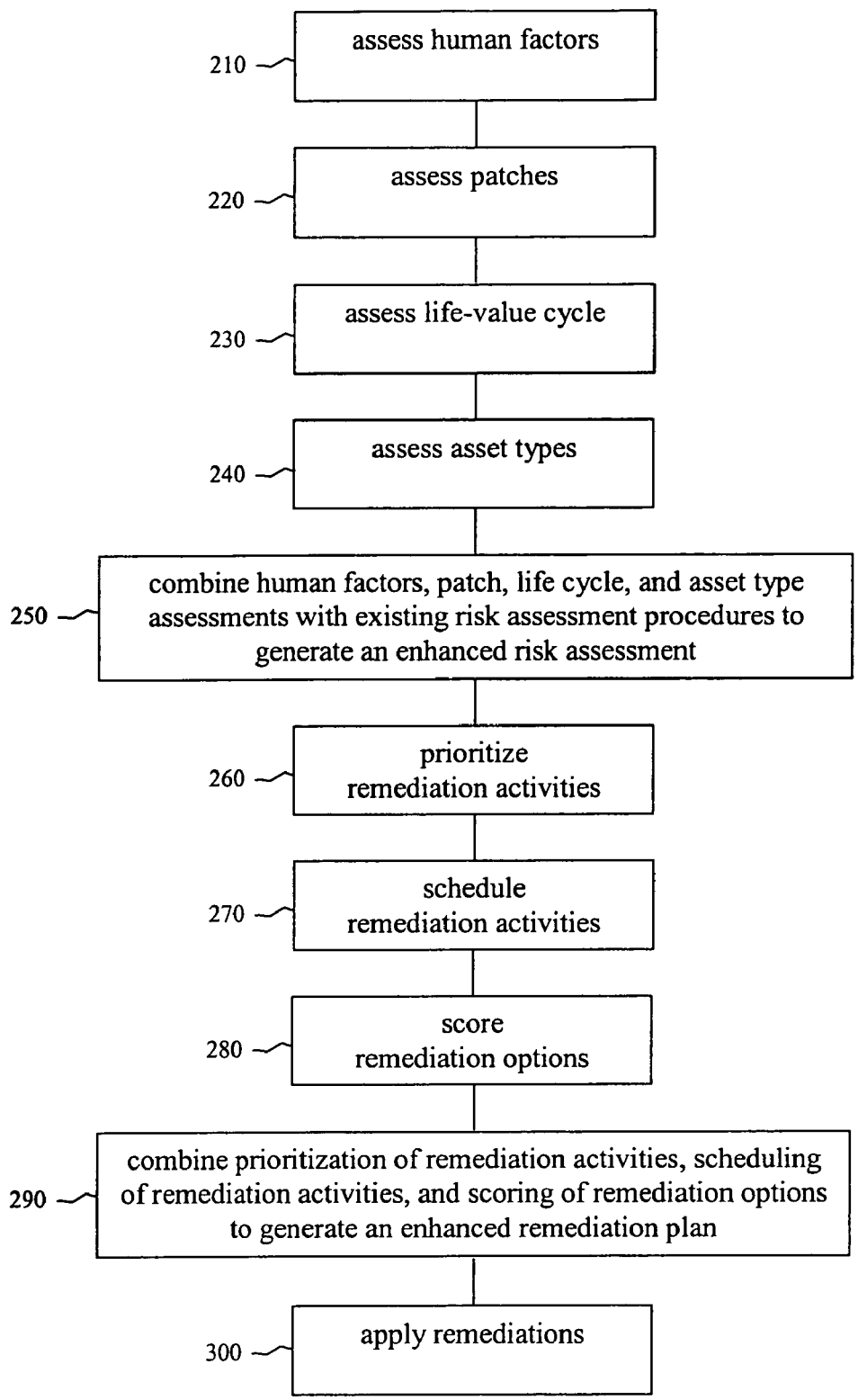
FIG. 2 is a flow chart illustrating a method of remediating one or more computer systems and/or computer networks based on identified vulnerabilities.

FIG. 2 illustrates an embodiment of a method for assessing the risks to a computing system and for assessing remediation options for those risks. In box 210, human factors that might pose a risk to the computing system are assessed. In box 220, remediations that might be applied to the computing system are assessed. In box 230, the life-value cycle is assessed for software and systems that are used in the computing system. In box 240, the types of assets used in the computing system are assessed. In box 250, the human factors assessment, the remediation assessment, the life cycle assessment, and the asset type assessment are combined with existing risk assessment procedures to generate an enhanced risk assessment.

Remediation activities are prioritized in box 260, remediation activities are scheduled in box 270, and scores for remediation options are assigned in box 280. In box 290, the prioritization of remediation activities, the scheduling of remediation activities, and the scores of the remediation options are combined into an enhanced remediation assessment. In box 300, remediations are applied in accordance with the prioritization, scheduling, scoring, budgeting, and other constraints earlier identified. The remediations might be applied automatically based on the priorities and/or the schedule. Alternatively, remediation recommendations might be generated automatically and reviewed by an administrator who might decide to implement some, all, or none of the remediations. The administrator might follow the recommended priorities and/or schedule or may implement the remediations based on some combination of subjective judgments and automatically generated priorities and/or schedules. At various stages, the remediation component 130 may be engaged to automatically remediate the identified vulnerability, such as by automatically obtaining and installing a remediation to a component of the enterprise computer system.

Figure 3:
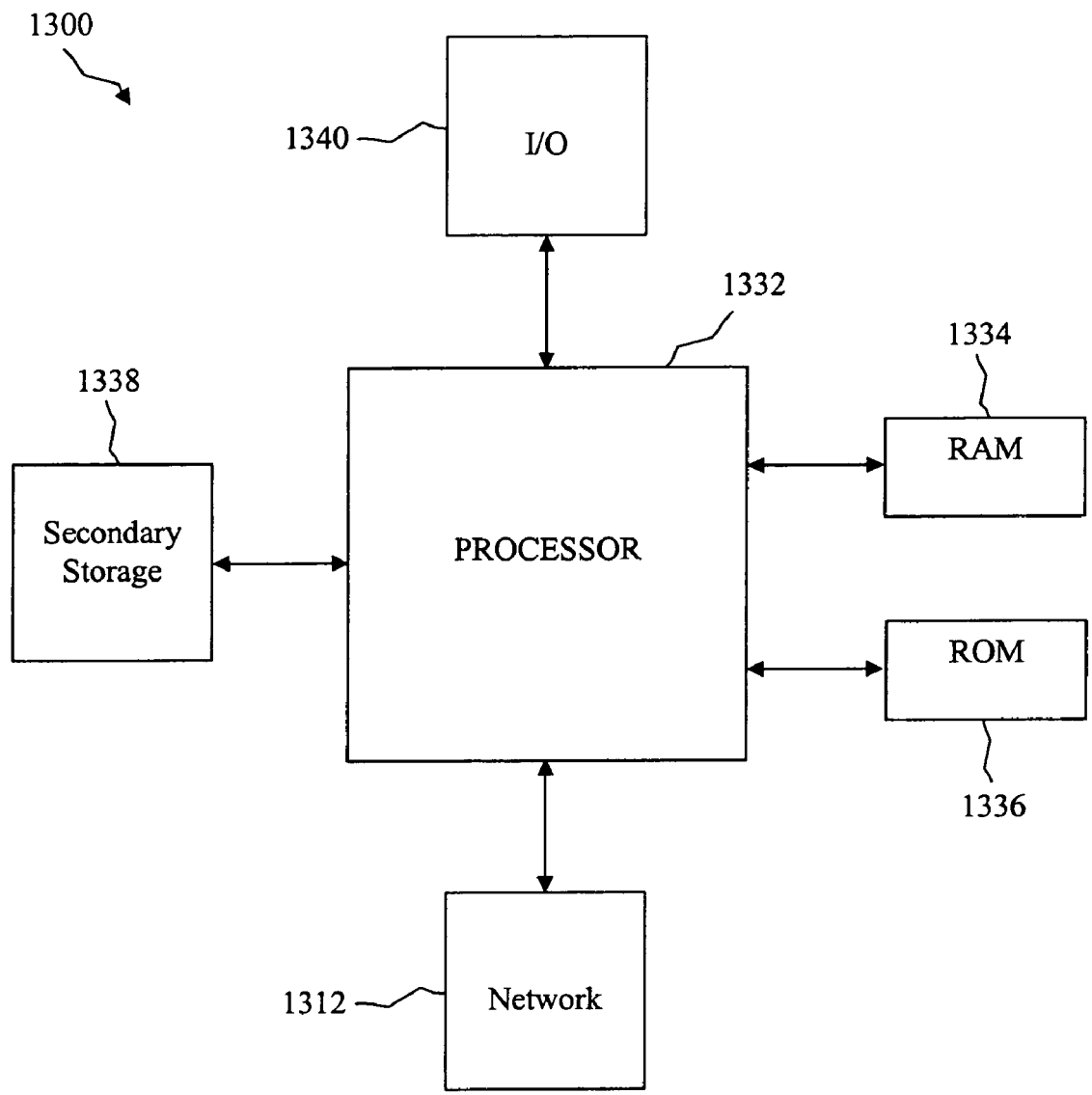
FIG. 3 is a block diagram of a typical computer system.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) 1340 devices, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data; Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O 1340 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from the network, or might output information to the network in the course of performing the above-described method steps. Such information, which is often represented as a sequence of instructions to be executed using processor 1332, may be received from and outputted to the network, for example, in the form of a computer data signal embodied in a carrier wave.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312.

While the present invention has been illustrated and described in terms of particular apparatus and methods of use, it is apparent that equivalent parts may be substituted for those shown and other changes can be made within the scope of the present invention as defined by the appended claims.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed is:

1. A method for assessing risk in executing vulnerability remediations to a computer network, comprising:
   identifying at least one human factor related to a risk posed by each of one or more individuals that have access to a portion of the computer network;
   determining one of a plurality of levels of risk for each of the individuals using at least one human factor, wherein determining the level of risk for each individual further comprises calculating a risk score for a plurality of vulnerability remediations to be considered for application to the portion of the computer network based at least in part on the levels of risk for each individual that has access to the portion of the computer network;
   selecting at least one of the vulnerability remediations to execute based at least in part on the relative risk scores of the plurality of vulnerability remediations considered; and
   executing the selected vulnerability remediations on the portion of the computer network.

2. The method of claim 1, wherein the human factor is further defined as a demographic factor.

3. The method of claim 2, wherein the demographic factor is selected from a group of demographic factors consisting of gender, age, marital status, nationality.

4. The method of claim 1, wherein the human factor is further defined as an employment status.

5. The method of claim 4, wherein the employment status is selected from a group consisting of full-time employees, part-time employees, contractors.

6. The method of claim 1, wherein the human factor is further defined as geographic location of the individuals that have access to the portion of the computer network.

7. The method of claim 1, wherein the human factor is further defined as a criminal record of the individuals that have access to the portion of the computer network.

8. The method of claim 1, wherein the human factor is further defined as a credit record of the individuals that have access to the portion of the computer network.

9. The method of claim 1, wherein the human factor is further defined as a seniority of the individuals that have access to the portion of the computer network.

10. The method of claim 1, wherein the human factor is further defined as job information selected from a group consisting of a job responsibility, a job title, and a computer network security access level.

11. The method of claim 1, further comprising:
    prioritizing the plurality of vulnerability remediations for selection; and
    scheduling the execution of the selected remediations.

12. The method of claim 1, further comprising automatically selecting and executing a vulnerability remediation on the portion of the computer network based at least in part on its risk score.

13. The method of claim 1, wherein the level of risk posed by each of the individuals is determined using only the human factor.

14. The method of claim 1, wherein the level of risk posed by each of the individuals is determined using the human factor in combination with one of an event factor and a type of access factor.

15. The method of claim 1, wherein the human factor is selected from a group of human factors consisting of an emotional disposition factor, a geopolitical factor, a demographic factor, a job positions factor, and a behavior factor.

16. A system for protecting a computer network from vulnerabilities, the system comprising:
    a risk assessment module to evaluate one or more risk factors to determine one of a plurality of levels of risk to each of a puerility of devices within the computer network, wherein at least one of the risk factors is a human factor used to assess risk posed by individuals that have access to each of the devices; and
    a remediation module to prioritize a plurality of remediations for remediating the devices, wherein the prioritization is based on the level of risk to each of the devices.

17. The system of claim 16, wherein the human factor is selected from a group of human factors comprising an emotional disposition factor, a geopolitical factor, a demographic factor, ajob positions factor, and a behavior factor.

18. The system of claim 16, wherein the risk assessment module further evaluates risk factors to each of the devices based on a type of access factor selected from a group comprising a location from which each of the devices accesses the computer network and a mobility of each of the devices.

19. The system of claim 16, wherein the remediation module remediates each of the devices with at least one patch, and wherein the risk assessment module further includes a patch component operable to assess a risk posed by the at least one patch.

20. The system of claim 16, wherein the risk assessment module further includes a life cycle component operable to assess risk to each of the devices based on variations of a value of each of the devices over time.

21. The system of claim 16, wherein the risk assessment module further includes an asset type component operable to assess an asset type risk factor to assess risk to each of the devices based on each of the devices being a particular type of device.

22. The system of claim 16, wherein the risk assessment module further includes a scheduling component to schedule remediation of the devices on the computer network based on the prioritization.

23. The system of claim 16, wherein the human factors is further defined as an emotional disposition factor.

24. The system of claim 16, wherein the human factors is further defined as a geopolitical factor.

25. The system of claim 16, wherein the human factors is further defined as a demographic factor.

26. The system of claim 16, wherein the human factors is further defined ajob positions factor.

27. The system of claim 16, wherein the human factors is further defined as a behavior factor.

28. The system of claim 16, wherein the risk factor evaluated by the risk assessment module determines the level of risk based at least in part on whether an identified vulnerability has an associated identified threat that exploits the identified vulnerability.

29. The system of claim 16, wherein the remediation module utilizes the level of risk to each of the devices to identify one or more devices that have a highest value, a highest risk, or would cause a greatest potential for disruption to the network upon succumbing to the one or more risk factors.

30. The system of claim 29, wherein the remediation module prioritizes the remediations based on a set of priorities for the network.

31. The system of claim 30, wherein the set of priorities includes at least one of a priority to first remediate the one or more devices with the highest value, the one or more devices with the highest risk, or the one or more devices with the greatest potential for disruption.

32. A method for protecting a computer network from vulnerabilities, the method comprising:
evaluating one or more risk factors to determine one of a plurality of levels of risk to each of a plurality of devices within the computer network, wherein at least one of the risk factors is a human factor used to assess risk posed by individuals that have access to each of the devices;
providing a plurality of remediation activities, wherein each remediation activity addresses a vulnerability of at least one of the plurality of devices;
prioritizing execution of the plurality of remediation activities, wherein the prioritization is based on the level of risk for each of the devices; and
executing the plurality of remediation activities in accordance with the prioritization.

33. The method of claim 32, wherein the human factor is selected from a group of human factors comprising an emotional disposition factor, a geopolitical factor, a demographic factor, a job positions factor, and a behavior factor.

34. The method of claim 32, wherein another of the risk factors is a remediation factor used to assess risk posed to each of the devices by the execution of one of the remediation activities.

35. The method of claim 34, wherein the assessment of risk using the remediation factor includes, for each remediation activity, comparing an amount of risk posed by not executing the remediation activity and an amount of risk posed by executing the remediation activity.

36. The method of claim 34, further comprising:
recommending whether to execute each of the remediation activities based on the risk assessed by the remediation factor.

37. The method of claim 32, wherein another of the risk factors is a life cycle factor used to assess risk to each of the devices based on variations of a value of each of the devices over time.

38. The method of claim 32, further comprising:
scheduling an order of execution of each of the remediation activities based on the prioritization.

39. The method of claim 32, further comprising:
identifying one or more devices that have a highest value, a highest risk, or would cause a greatest potential for disruption to the network upon succumbing to the one or more risk factors based on the evaluated level of risk to each of the devices.

40. The method of claim 39, wherein the prioritization of the remediation activities is further based on a set of priorities for the network.

41. The method of claim 40, wherein the set of priorities includes at least one of a priority to first remediate the one or more devices with the highest value, the one or more devices with the highest risk, or the one or more devices with the greatest potential for disruption.

42. A method for protecting a computer within a network from one or more vulnerabilities, the method comprising:
evaluating two or more risk factors to determine a level of risk to the computer, wherein a first risk factor is a human factor used to assess risk posed by individuals that have access to the computer and a second risk factor is a value of the computer;
providing at least one remediation activity for reducing the level of risk to the computer;
scheduling the at least one remediation activity to minimize adverse effects caused by the at least one remediation activity; and
executing the at least one remediation activities in accordance with the schedule.

43. The method of claim 42, wherein the evaluated level of risk to the computer directly corresponds with the value of the computer.

44. The method of claim 42, wherein the value of the computer dynamically changes over time in accordance with one of a periodic increase and decrease in the value over time or a steady decline in the value over time.

45. The method of claim 42, wherein the value of the computer is based on a type of asset provided by the computer, wherein the type of asset includes one or more of a database or source code.

* * * * *

UNITED STATES PATENT AND TRADEMARK OFFICE
CERTIFICATE OF CORRECTION

PATENT NO. : 7,278,163 B2 Page 1 of 1
APPLICATION NO. : 11/062409
DATED : October 2, 2007
INVENTOR(S) : Banzhof et al.

It is certified that error appears in the above-identified patent and that said Letters Patent is hereby corrected as shown below:

Title Page #56 under "OTHER PUBLICATIONS," within the "International Search Report and Written Opinion of the International Search Authority" publication entry, replace "International Appl. No. PCT/US2006/055110" with -- International Appl. No. PCT/US2006/05110 --

Col. 16, line 20, replace "puerility" with -- plurality --

Col. 16, line 31, replace "ajob" with -- a job --

Col. 16, line 63, replace "ajob" with -- a job --

Col. 17, line 37, replace "ajob" with -- a job --

Signed and Sealed this

Eighteenth Day of December, 2007

JON W. DUDAS
*Director of the United States Patent and Trademark Office*